Dec. 19, 1922.
P. ST. CLAIR, Jr.
HIGH TEMPERATURE PREHEATER FOR FLUIDS.
FILED MAY 24, 1919.
1,439,340.
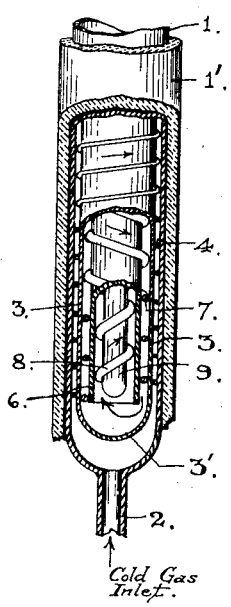
Fig. 1.
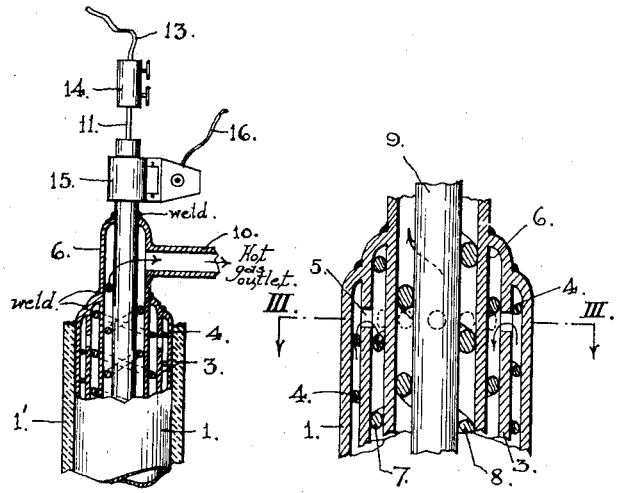
Fig. 2.
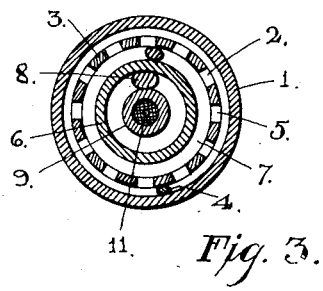
Fig. 3.
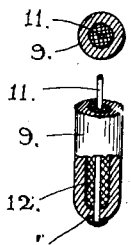
Fig. 4.
Fig. 5.
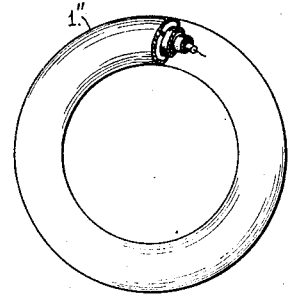
Fig. 6.
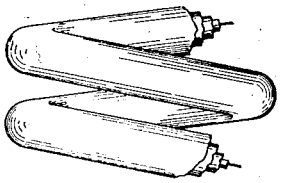
Fig. 7.
Inventor.
per Palmer St. Clair, Jr.
Chas P Hidden
Attorney.

Patented Dec. 19, 1922.

1,439,340

UNITED STATES PATENT OFFICE.

PALMER ST. CLAIR, JR., OF NIAGARA FALLS, NEW YORK, ASSIGNOR TO THE NITROGEN CORPORATION, OF PROVIDENCE, RHODE ISLAND, A CORPORATION OF RHODE ISLAND.

HIGH-TEMPERATURE PREHEATER FOR FLUIDS.

Application filed May 24, 1919. Serial No. 299,624.

*To all whom it may concern:*

Be it known that I, PALMER ST. CLAIR, Jr., a citizen of the United States, residing at Niagara Falls, in the county of Niagara and State of New York, have invented certain new and useful Improvements in High-Temperature Preheaters for Fluids, of which the following is a specification.

This invention relates to preheaters for fluids, the latter being under any desired pressure, ranging from low to extremely high; and the apparatus herein described being especially useful for heating gases and their mixtures to high temperatures, under high pressures, for various synthetic processes, e. g., the synthesis of ammonia from its elements.

Said apparatus is, however, readily adapted also for the lower pressures and temperatures, for any process or operation where heated gases or their mixtures are advisable or necessary.

The principal object of the invention is to provide an extremely efficient apparatus of the character in question. Another object is to make said apparatus simple, compact and inexpensive.

These and other objects of my invention will be hereafter referred to and the novel combinations of elements whereby said objects may be attained will be more especially pointed out in the claims appended hereto.

In the drawing which forms part hereof, I have exemplified a preferred construction;
but as I am aware of various changes and modifications which may be made herein without departing from the spirit of my invention, I desire to be limited only by the scope of said claims, broadly considered in the light of my disclosure.

Referring to the drawing:

Fig. 1 is a side elevation of a preheater, broken away to show details of construction.

Fig. 2 is an enlarged vertical fragmentary section of part of the upper end of said preheater.

Fig. 3 is a section taken on the line III—III of Figure 2.

Fig. 4 is a transverse section of the preferred heating element.

Fig. 5 is a fragmentary detail of the lower end of said element.

Fig. 6 is a plan view of a fragment of a preheating coil, made up substantially like the device shown in Figure 1; and

Fig. 7 is an elevation of said fragment of a coil.

The apparatus shown by way of illustration, comprises an outer casing 1, preferably surrounded by heat-insulating-material 1', and provided at its lower end with a pipe or connection 2, welded gas-tight thereto; said pipe constituting the inlet for the gas to be preheated.

Within the casing 1 is a similar casing 3 upon which is helically wound wire 4, or the like; the diameter or thickness of this being such that twice this distance is substantially equal to the difference between the inside diameter of the outer tube or casing 1 and the outside diameter of the casing 3. In other words, the helical wrapping 4 maintains the tubular casing 2 concentric within casing 1. It performs a further and more important function, however, in that it provides a helical course for the incoming gas, which, in effect, circles around and around the space between these casings, during the ascent of such gas through said space.

The upper end of casing 1 is turned over into engagement with casing 2 and welded gas-tight thereto; while just below this welded jointure, the casing 2 is provided with a series of apertures or ports 5, to afford egress of the gas into a similar and preferably oppositely directed helical course, between casing 2 and a third tubular casing 6, therewithin.

The helical wrapping 7, of wire or the like, which in turn holds casing 6 concentric with casing 3, is preferably of somewhat greater thickness or diameter than is wrapping of wire 4; and the outside diameter of casing 6 is correspondingly less; so that the cross-sectional area of the preferably annular space between casings 6 and 3 may be substantially the same as that between casings 3 and 1.

The bottom of casing 3 is closed, as at 3' to compel the gas entering casing 1 to flow up between said casing and that designated 3, and also to compel the gas emerging from the downward helical course between casings 3 and 6, to again turn upwardly, for travel through a third and similar helical passage formed by a third wrapping 8 upon the outer shell or covering 9 of the heating unit, hereinafter described.

The wire or wrapping 8 preferably is of still larger diameter or thickness than wire 7; so that, correspondingly, the cross-sectional area of the helical passage provided between the shell 9 and casing 6, is substantially the same as that between casings 3 and 6; while, again, the wrapping preferably contacts with both covering 9 and casing 6.

The top of casing 3 is preferably turned over and welded to casing 6, and the latter is extended beyond the weld of casing 3 thereto, sufficiently to allow for the connection of a pipe 10 to casing 6, to permit of the emergence of the gas ascending within said casing.

I prefer to form casings 1, 3 and 6, and shell 9 of metal tubing of thickness such as to enable it to withstand the pressures to which it may be subjected; and to weld all connections and joints gas-tight. In effect, therefore, the preferred construction consists of the interior heating element and three spaced concentric tubes therearound respectively separated from each other by helical windings or wrappings; the whole being most compact and free from movable elements or parts.

The heating unit may be of any suitable description and heat may, of course, be supplied from any source adapted to the particular temperature to which the gas to be preheated is to be raised. I greatly prefer, on the ground of economy of operation, compactness of construction, and cost of manufacture,—to use electricity as the source of heat. To this end the covering 9 may be of steel and it may have, preferably axially disposed therewithin, a resistor 11 which may conveniently be of heat resistant alloy, such as one of nickel, iron and chromium, with or without an admixture of manganese. A very suitable resistor may be made from "nichrome" wire, which consists of such an alloy. The resistor 11 is preferably covered with or surrounded by material 12 which is highly heat resistant and substantially non-conductive of electricity. Thus the insulation 12 may be a fused silica tube.

As shown in Figure 5, the lower end of the wire 11 is preferably welded gas-tight to the steel cover 9, as at 12'; so that current from the lead 13 may flow down from the connection 14 through resistor 11 to the lower end of the conductive casing 9, and thence back through the latter and the connection 15, to the opposite or return lead 16, or vice versa.

The operation of the device is as follows:

The resistor 11 and shell 9 are preferably heated to, for example, bright redness or near incandescence, and the gas to be preheated,—which may be, by way of illustration a mixture of three parts by volume of hydrogen to one of nitrogen,—flows in via inlet 2; ascends through the annular space between casings 1 and 3 with a rotary motion due to the helical winding 4; passes thence through the connecting ports 5 into the annular space between casings 3 and 6; descends therethrough with a continued rotary motion, caused by the wrapping 7; enters the open end of the bottom of the tube or casing 6; and flows up, rotarily, directly in contact with the highly heated shell 9; and finally emerges through pipe 10, preheated, if desired, to 1000° C. or more. The helical or spiral motion of the gases through the more or less constricted channels afforded by the apparatus, gives said gases a film-like contact with the heated surfaces, and a high surface velocity. In addition the gases are very efficiently agitated and mixed; centrifugal action playing a part in this. Heat is imparted from the highly heated shell 9 to the casing 6 by convection through the intermediacy of the gaseous stream; by radiation; and by conduction through the wrapping 8, of steel wire or the like. Heat in turn is imparted to casing 3 from casing 6, through the preferably metallic wrapping 7 and by convection; and, finally, the outer casing 1 receives, of course, a considerably less amount of heat from casing 3, in similar fashion. Thus the incoming, cold gas is increasingly warmed by contact with casings 3 and 1 and the separating coil 4 therebetween, as it progresses toward the ports 5. It is more highly heated during its downward travel between casings 3 and 6; and ultimately emerges from its helical course through the hot zone between casing 6 and shell 9, preheated very nearly to the temperature of said shell.

It will be observed that the counter current principle is consistently embodied substantially throughout the apparatus and the efficiency obtained by this novel application thereof, is such that it approximates 98%.

The apparatus, moreover, is small, compact, practically indestructible, simple and of low cost. There need be no joints, gaskets, stuffing glands, valves, adjustments, etc.

There is a minimum consumption of current when electricity is used, as described. The temperature of the emerging gas is under accurate control. There is no expense of up-keep; and there is possible a wide range of rate of flow, temperature and pressure of the gas being treated.

These numerous advantages are made possible, in large part, by the simple provision of spiral or helical wrappings of preferably heat conductive material, in combination with the nested or concentrically disposed series of casings or tubes which said wrappings space apart and yet heat-conductively connect.

I do not desire, however, to be limited in the broader aspects of my invention to any particular number, shape or disposition of the casings or means in connection therewith for establishing a circuitous preferably definitely constricted hot zone and a preferably similar cooler zone in propinquity thereto; nor, as aforesaid, to any particular type of heating element or source of heat; altho I have shown and described, by way of illustration, a construction which, embodying as it does, all of the advantages above noted,—is probably better adapted for all around utility than any other form of my device with which I am acquainted.

I may add that it is by no means essential that the preheater be rectilinear or straight, as shown in Figure 1, since the concentric tubes may be formed, for example, into a coil, after the fashion of the fragment shown in Figures 6 and 7.

That is to say, in general, that this particular form of my novel preheater adapts itself to almost any location in which a pipe may be placed; a feature of obvious value in connection with many chemical processes, —especially where liquids are to be preheated or even gasified.

In conclusion, I particularly wish to emphasize the great advantage to be thus, or similarly, derived from the establishment of a winding course around or over the surface of a heating element,—the overall dimensions of which are usually more or less limited,—so that there is thereby constituted a hot zone of great lineal extent as compared to said overall dimensions of said heating means. In this connection I may add that in order to secure maximum efficiency, this winding course should be so closed laterally, between successive or adjacent turns thereof, as to prevent lateral passage, or escape, of the fluid, from one turn or winding into another; so that substantially all of the fluid must travel through a determined or definitely established course.

Having thus described my invention, what I claim is:

1. A device for imparting heat to fluids, which comprises means to form a constricted course for the fluid to be heated, said course including a circuitous hot zone through which the more highly heated fluid passes, to still further raise the temperature of such heated fluid, and a circuitous cooler zone through which the less highly heated fluid flows on its way toward said hot zone, said cooler zone being in propinquity to said hot zone and receiving therefrom heat which escapes from said hot zone through the walls thereof, and means to directly heat said hot zone and thereby indirectly, to heat said cooler zone, as aforesaid, said walls being of heat conductive material.

2. A device for imparting heat to fluids, which comprises means to form a constricted course for the fluid to be heated, said course including a hot zone, the walls of which confer a rotary movement upon the fluid passing through said hot zone, and a cooler zone the walls of which act similarly upon the fluid traversing said cooler zone while said fluid is on its way to said hot zone, said course being in effect doubled back upon itself to dispose said zones in propinquity to permit said cooler zone to receive heat from said hot zone, the material separating the said zones being highly heat conductive, and means to heat said hot zone.

3. A device for imparting heat to a fluid, which comprises a plurality of casings disposed in propinquity to permit of transfer of heat from one to another, and means to supply said heat to an inner one of said casings, said casings having means to establish therebetween a circuitous constricted course for the fluid to be heated, a part of said course winding in immediate proximity to said heat supplying means to constitute such part a hot zone of great lineal extent as compared to the overall dimensions of said heat supplying means and a second part of said course extending between the outer side of said inner casing and the casing next outside the same, to constitute a cooler zone which receives heat from said hot zone and imparts such heat to the fluid traveling through said cooler zone toward said hot zone, the walls between said zones being highly heat conductive.

4. A device for imparting heat to a fluid, which comprises heating means provided with a heat supplying surface of determined overall dimensions, a heat conductive casing spaced from said heat supplying surface adapted to receive heat therefrom, and forming with said heat supplying surface a hot zone, a fluid deflecting winding interposed between said heat supplying surface and said casing, a second winding of fluid deflecting means substantially in contact with the outer surface of said casing and means to coact with said second winding and the surface of said casing to establish a cooler zone which receives heat thru said casing and yields the same to the fluid traversing said cooler zone, said hot zone being in series with said cooler zone and receiving fluid therefrom.

5. A device for imparting heat to a fluid, which comprises a heating element, a plurality of casings surrounding said element but spaced therefrom and from each other, and means wound between and substantially in contact with the adjacent casings and the innermost of said casings and said element to maintain said casings and element substantially concentric while at the same time establishing in the spaces therebetween a substantially helical course through which the fluid travels, and connections, respectively, to deliver fluid to and receive it from said course.

6. A device for imparting heat to a fluid, which comprises a heating element, a metallic casing surrounding said element but spaced therefrom, and metallic, heat conductive means wound between said casing and element to maintain said casing and element substantially concentric while at the same time establishing in the space therebetween a substantially helical course through which said fluid travels.

7. A device for imparting heat to a fluid, which comprises a heating element in combination with means to constitute a substantially helical hot zone around said heating element, a part at least of said means being highly heat conductive to convey heat laterally away from said zone, and means to constitute a substantially helical cooler zone around said hot zone, said heat conductive part conveying heat to said cooler zone and the latter being connected to said hot zone to deliver fluid initially preheated by said heat conveyed by said part, to said hot zone, for further heating.

8. A device for imparting heat to fluid, which comprises a heating element in combination with a tubular casing therearound, a substantially helical fluid deflecting wrapping between and in contact with said element and casing, a second tubular casing around the first, a second fluid deflecting helical wrapping between said casings, and connections to deliver the fluid, to be heated, to the space between said casings for passage therethrough and thence through the space between said first casing and element.

9. A device for imparting heat to fluid, which comprises a heating element in combination with a series of spaced tubular casings therearound and substantially concentric therewith, wrappings in the spaces between said casings to establish definite substantially helical courses through said spaces, and connections to deliver the fluid to be heated, first to the outermost space, for passage thence progressively inward, through said courses, toward and around said element.

10. A device for imparting heat to fluid, which comprises an extended electrically heated resistor element in combination with a series of spaced tubular casings therearound and substantially concentric therewith, wrappings in the spaces between said casings to establish definite substantially helical courses through said spaces, and connections to deliver the fluid to be heated, first to the outermost space, for passage thence progressively inward, through said courses, toward and around said resistor.

11. A device for imparting heat to a fluid, which comprises a heating element in combination with means to constitute a circuitous, laterally restricted course around said heating element, and co-acting means to constitute a circuitous, correspondingly restricted cooler zone around said hot zone, said co-acting means being heat conductive to permit heat to pass from said hot zone to said cooler zone, said zones being connected in series to deliver fluid, which has been partly heated in said cooler zone, to said hot zone.

12. A device for imparting heat to a fluid, which comprises an elongated heating element, a plurality of tubular members of varying diameters arranged concentric with and outwardly of said heating element, and means forming definite substantially helical courses within the spaces between said tubular members and within the space between said heating element and the innermost of said tubular elements.

13. In a fluid heating device, an elongated heating element, a plurality of tubular members of varying diameters arranged outwardly of said heating element to form spaces between the adjacent tubular members and between the innermost tubular member and said element, and means for forming a definite circuitous passage traversing successively the spaces between said tubular members and the space between the heating element and the innermost tubular member.

14. In a fluid heating device, an elongated heating element, a plurality of tubular members of varying diameters arranged outwardly of said heating element and substantially concentric therewith to form spaces between the adjacent tubular members and between the innermost tubular member and said element, and means for forming a definite circuitous passage, a portion of which is arranged in the form of a helix, traversing successively the spaces between said tubular members and the space between the heating element and the innermost tubular member.

15. In a fluid heating device, an elongated heating element, a plurality of tubular members of varying diameters arranged outwardly of said heating element to form therewith a series of substantially concentric spaces, and means for forming a definite circuitous passage through said spaces in the order of their concentric arrangement.

16. In a fluid heating device, an elongated heating element, a plurality of tubular members of varying diameters arranged outwardly of said heating element and substantially concentric therewith, and means for forming a definite circuitous passage through said tubular members in the order of their arrangement.

17. In a fluid heating device, an elongated heating element, a plurality of heat conductive tubular members of varying diameters arranged outwardly of said heating element and substantially concentric therewith, and means for forming a definite circuitous passage for a fluid to be heated whereby the walls of said members will impart a rotary movement to the fluid passing therethrough.

In testimony whereof I have affixed my signature, in the presence of two witnesses.

PALMER ST. CLAIR, Jr.

Witnesses:
CHARLES F. VAUGHN,
JOHN COLLINS CLANCEY.

Certificate of Correction.

It is hereby certified that in Letters Patent No. 1,439,340, granted December 19, 1922, upon the application of Palmer St. Clair, jr., of Niagara Falls, New York, for an improvement in "High-Temperature Preheaters for Fluids," an error appears in the printed specification requiring correction as follows: Page 1, line 92, for the word "of" read *or;* and that the said Letters Patent should be read with this correction therein that the same may conform to the record of the case in the Patent Office.

Signed and sealed this 13th day of February, A. D., 1923.

[SEAL.]
KARL FENNING,
*Acting Commissioner of Patents.*